March 21, 1933.　　　　F. W. ANDREW　　　　1,902,606

METHOD OF MAKING A SPRING COVER

Filed March 12, 1930

Inventor
FRED W. ANDREW

Attorney
A. D. T. Libby

Patented Mar. 21, 1933

1,902,606

UNITED STATES PATENT OFFICE

FRED. W. ANDREW, OF PHILADELPHIA, PENNSYLVANIA, ASSIGNOR TO BRIGGS & STRATTON CORP., OF MILWAUKEE, WISCONSIN, A CORPORATION OF DELAWARE

METHOD OF MAKING A SPRING COVER

Application filed March 12, 1930. Serial No. 435,054.

This invention relates to means for covering the springs of an automotive vehicle so that they are protected from mud, dirt, water, and the like, whereby the efficiency and life of the spring is greatly enhanced.

It is the principal object of my invention to provide a novel method of making a spring cover of the character described from a single piece of metal, and so constructed as to be quickly applied to the spring and present a neat finished appearance.

In order that the cover may respond to or follow the action of the spring, the sides must be constructed so as to have relative movement and hence the sides must be in sections which overlap each other, and it is quite a problem to secure the necessary amount of overlap so as to prevent the deleterious elements from getting in and the lubricant from coming out. Furthermore, the overlap must be sufficient so as to keep the burlap or other wrapping on the spring, which will be later referred to, from being cut or worn at the side joints of the cover. This is of special importance where the cover is applied to long flat springs such as are usually used at the rear of the vehicle.

In my present application, the cover is designed so as to meet these objections and to be applied to the spring from the top or bottom, but in order to do this the cover must be initially constructed in a certain definite way which will be hereinafter pointed out.

Figure 3:
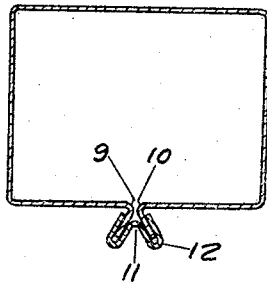
Figure 3 is a section on the line 4—4 of Figure 2, showing the interlocking member applied ready to complete the interlock between the edges of the cover.
Figure 4:
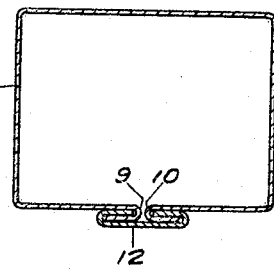
Figure 4 is a section on the line 4—4 of Figure 2, with the cover in its completed position.

In both Figures 3 and 4 the leaves of the spring are not shown.

In the various views, 1 illustrates half of a multiple leaf spring held together by a bolt 2. The whole spring is held to the axle by the usual U bolts not shown. The upper or inner leaf of the spring is formed at 3 in the usual manner to take a shackle bolt 4.

Figure 1:
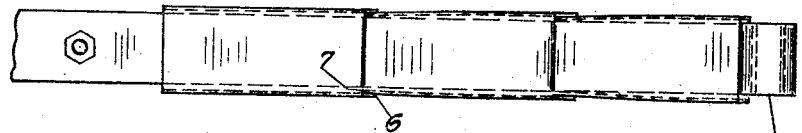
Figure 1 is a view on a reduced scale looking down on the top of one-half of a spring with my spring cover in position.
Figure 2:
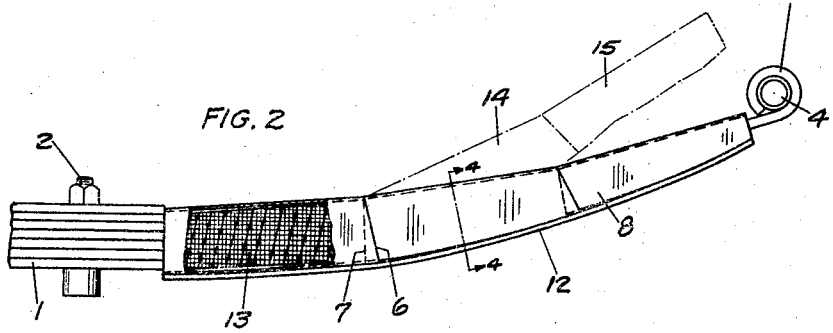
Figure 2 is a side elevation of Figure 1, a small portion of the spring cover being broken away to show the method of assembly of the spring, and also showing in dotted line the manner in which the cover is initially formed before being applied to the spring.

It has been pointed out that where the spring to be covered is a long flat one, such as the rear spring of an automotive vehicle, a special construction must be resorted to in order to get the necessary amount of overlap along the sides of the cover; otherwise, the cover will not function properly as has been set forth. To meet this condition, as well as to provide a cover which may be put on to the spring from either side thereof, I have worked out the following method of procedure:

After making a blank from sheet metal of a suitable material, this blank is formed into the shape of a generally curved channel, the curve preferably being not smooth but arranged in what may be termed sections, as indicated by the numerals 14 and 15 in Figure 2. These sections may be at the same angle, one with the other, or the angle may differ at different sections of the cover, depending on the nature of the spring that is to be covered. The radius of the general curvature of the various sections of the channel-shaped cover is less than the radius of the curvature of the spring, if the spring is one that has curvature, as distinguished from a long flat spring.

In the formation of the channel-shaped cover, one method of procedure is to place the blank longitudinally over the curved face of a die and then impress thereon the other part of the die, thereby forming the blank into a channel by what I term a draw-forming process by which the metal in the sections is stretched or displaced so that after slitting the opposite sides of the channel, as indicated by the numerals 6 and 7, these sides will pass into overlapping position as indicated in Figure 2 when the cover is forced into position on the spring.

A similar result may be obtained by first slitting the blank on opposite edges and then rolling or swaging the sections thus formed so as to secure expansion of metal at the slits, whereby there will be sufficient metal at these places to produce the necessary amount of overlap when the cover is forced into position as has been mentioned. After the channel member has been thus formed, the cover 5 may be placed on the spring in either position.

As shown in the drawing, it is applied from the top of the spring and the sections of the cover are bent over the edges and bottom side of the spring 1 so as to bring the flanges 9 and 10, which have been previously formed, into close juxtaposition.

In order to lock the flanges together, I may use several arrangements, the one illustrated comprising a single piece seam member 12 made somewhat like an inverted W, whereby the wedge portion 11 is adapted to enter between the diverging flanges 9 and 10. After the seam cover has been placed into position, a suitable tool is brought into the V portion 11, thereby spreading the flanges 9 and 10 and flattening out the seam member 12 so as to complete the interlock as indicated in Figure 4.

Before placing the cover on the spring, it is preferable to cover the springs with a lubricant such as graphite and then wrap them with a cover of suitable material such as canvas or burlap 13, whereby after the cover 5 has been placed in position and secured as already described, the lubricant is retained within the wrapping and the spring is kept in condition to work at its highest efficiency. Where the spring shackle bolts 4 are lubricated with oil, this oil will work down from the top leaf 3 of the spring, and this oil is retained within the springs by said wrapping.

By this method of constructing and applying a spring cover, I have obtained a spring cover which gives a perfectly smooth surface on one side of the spring and practically a smooth surface on the other side, whereby mud and dirt may be quickly wiped off, thereby giving the spring with its cover, a neat appearance, particularly when the locking member is on the under side of the spring.

Having thus described my invention, what I claim is:

1. The method of covering a vehicle spring, which consists in taking a flat metal strip and draw-forming this into a curved channel-shaped member, then slitting the sides of the channel into sections, forming flanges at the free edges of said sections, then placing the channel over the spring so the web of the channel fits on one side of the spring, forcing the sides of the channel member over the edges and other side of the spring so said flanges are in close juxtaposition along said other side of the spring, placing a continuous substantially W-shaped seam member of metal over said flanges, said seam member being formed to engage each of said flanges on both sides thereof, between the legs of the W, and then spreading said flanges and at the same time flattening the seam member against the side of the spring.

2. The method of covering a vehicle spring, which consists in taking a flat metal strip and draw-forming this into an irregular curved channel-shaped member, said curvature being on a radius shorter than the normal radius of the curvature of the spring, then slitting the sides of the channel into sections, forming flanges at the free edges of said sections, then placing the channel over the spring with the web of the channel on the one side of the spring, then forming the sides of the channel over the edges and other side of the spring, bringing said flanges into close juxtaposition along said other side of the spring, placing an inverse W-shaped member over said flanges, and then spreading and flattening the seam member.

3. The method of covering a vehicle spring, which consists in taking a flat metal strip and forming this into a curved channel-shaped member, then slitting the sides of the channel into sections, rolling or swaging said sections to produce metal for overlap, forming flanges at the free edges of said sections, then placing the channel over the spring so the web of the channel fits on one side of the spring, forcing the sides of the channel member over the edges and other side of the spring so said flanges are in close juxtaposition along said other side of the spring, placing a continuous substantially W-shaped seam member of metal over said flanges, said seam member being formed to engage each of said flanges on both sides thereof between the legs of the W, and then spreading said flanges and at the same time flattening the seam member against the side of the spring.

4. The method of making a spring cover consisting in shaping or forming a piece of metal in the form of a substantially straight channel, shaping said channel to spread the metal of the sides to give an arcuate form to the channel, then cutting the sides from the edge of the base of the channel, and then reshaping the arcuate channel to straight form to cause the cut edges to overlap.

5. The method of making a spring cover consisting in shaping or forming a piece of metal in the form of a substantially straight channel, shaping said channel to spread the metal at the outer portion of the sides and crowd together the metal of the bottom of the channel and the adjacent portion of the sides giving to the channel an arcuate shape, then cutting the channel sides from their edges to the bottom of the channel, and then reshaping the arcuate channel to straight form to cause the cut edges to overlap.

6. The method of making a spring cover consisting in forming a blank of metal in a die to channel form and in the same operation stretching the channel sides, then cutting the stretched sides at a plurality of places, and then reforming the cover to return the sides to their original length causing the sides to overlap at the cuts.

In testimony whereof, I affix my signature.

FRED. W. ANDREW.